(No Model.) 2 Sheets—Sheet 1.
P. SCHLACHTER & F. HEINTZ.
GLASS MELTING FURNACE AND REGENERATOR.
No. 387,818. Patented Aug. 14, 1888.
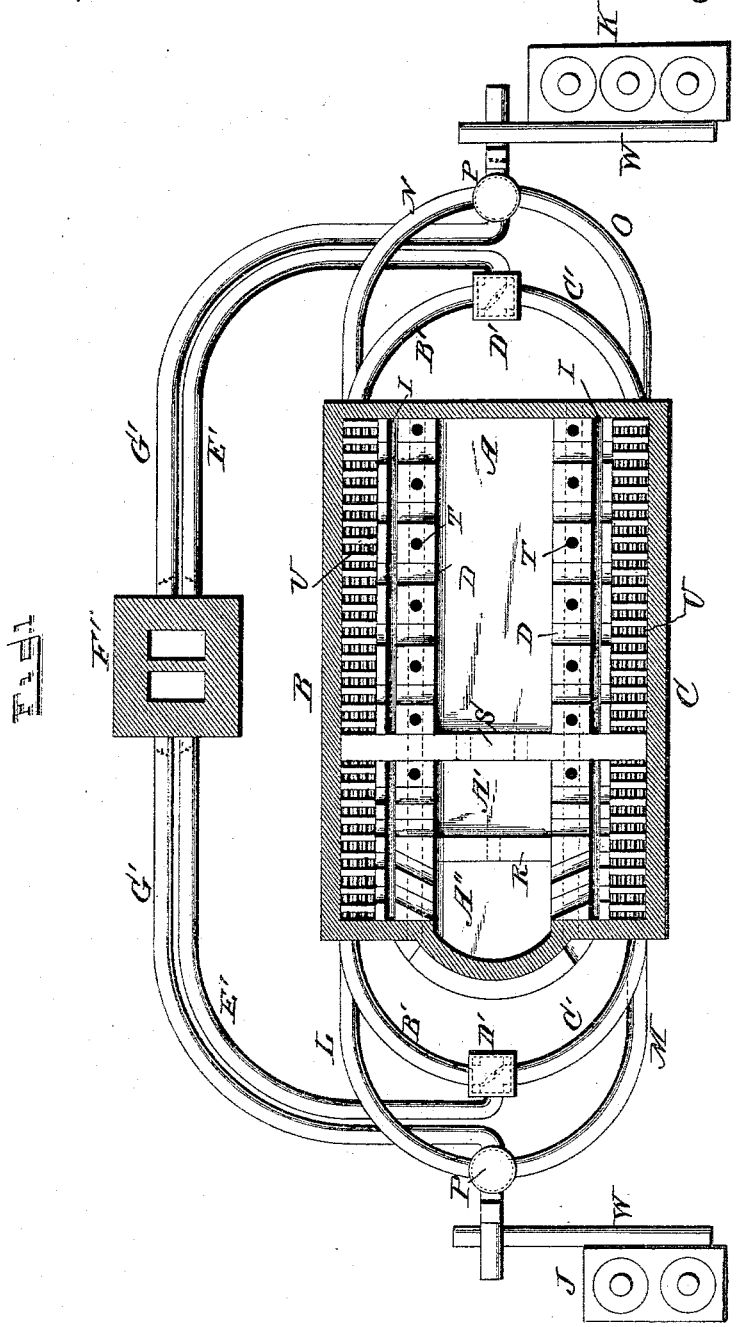
WITNESSES,
G. S. Elliott,
Wm B. Carr.
INVENTORS,
Philipp Schlachter.
Fritzof Heintz.
per Chas. H. Fowler
Attorney.

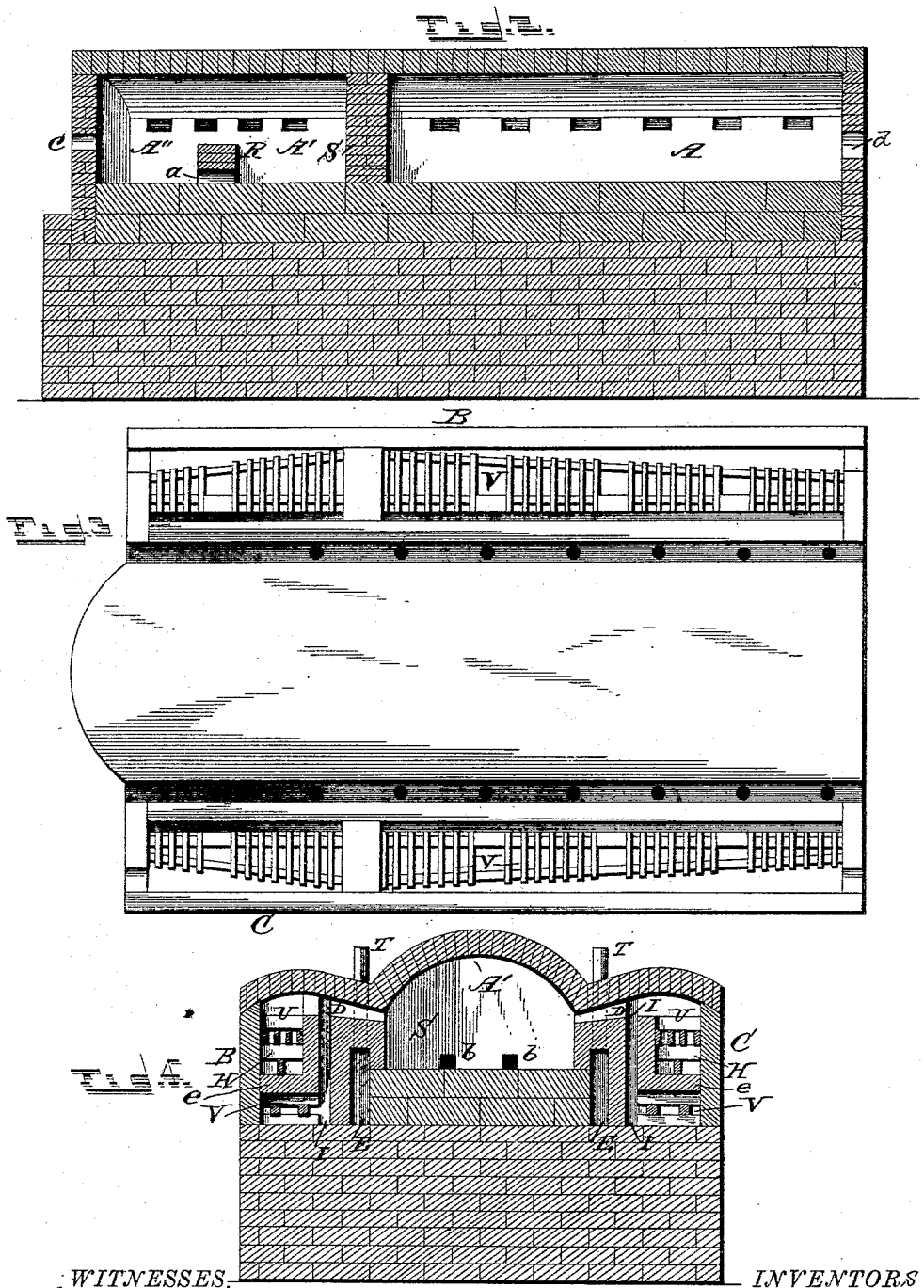

UNITED STATES PATENT OFFICE.

PHILIPP SCHLACHTER AND FRITIOF HEINTZ, OF STREATOR, ILLINOIS.

GLASS-MELTING FURNACE AND REGENERATOR.

SPECIFICATION forming part of Letters Patent No. 387,818, dated August 14, 1888.

Application filed April 9, 1888. Serial No. 270,065. (No model.)

*To all whom it may concern:*

Be it known that we, PHILIPP SCHLACHTER and FRITIOF HEINTZ, citizens of the United States, residing at Streator, in the county of La Salle and State of Illinois, have invented certain new and useful Improvements in Glass-Melting Furnaces and Regenerators; and we do hereby declare that the following is a full, clear, and exact description of the same, reference being had to the annexed drawings, making a part of this specification, and to the letters and figures of reference marked thereon.

Figure 1 of the drawings is a top plan view of our invention, partly in section; Fig. 2, a longitudinal section through the melting-chamber; Fig. 3, a top plan view thereof, showing the interior construction; and Fig. 4, a transverse vertical section.

The present invention has relation to that class of glass-melting furnaces and regenerators for which a patent was granted to Fritiof Heintz May 17, 1887, No. 362,961, and is designed as an improvement thereon.

The object of the invention is to improve the construction of the furnace and regenerator, wherein a double furnace is provided which will require less fuel, melt glass much better and quicker, and is equally well adapted to working any and all kinds of glass of any description whatever, a double tank being provided with two separate generators and producers on each end or side of the furnace, so that one set of producers will melt the glass in the melting-tank and the other set will melt and clear the glass in the clearing and working tank.

The object of the invention whereby these advantages are attained will be hereinafter described, and subsequently pointed out in the claims.

In the accompanying drawings, A represents the melting-tank or combustion-chamber, in which is placed the material to be melted, said tank or chamber being lined with firebrick or other similar material usually employed as a lining for this class of furnaces. The furnace is preferably made shallow and of any suitable length and height, so that the material placed therein will be equally exposed to the heat of the burning gases in order to facilitate the melting process.

At the sides of the melting-tank or combustion-chamber A are the chambers B C, which communicate therewith by flues D; or, if preferred, instead of continuous flues, a series of ports may be used, as is common in this class of furnaces.

The melting-tank or combustion-chamber is separated from the chambers above described by means of the open spaces E, which serve to keep the walls of the tank or combustion-chamber cool, in order to protect the same from excessive heat.

The chambers B C are provided with division-walls, which divide them into two compartments, H and I, the former being the air-regenerating chambers and the latter the flues or chambers through which the gas is admitted to mingle with the air and effect a complete combustion.

Instead of a single set of gas producers or generators, as in the patent hereinbefore referred to, two sets are employed, as shown at J K, and may be of substantially the same construction, or any of the kind usually employed in this class of furnaces, and are connected with the furnace by pipes L M and pipes N O. At the juncture of these pipes are reversing-valves P, of any well-known form and construction, which control the direction of the gas.

The clearing-tank and the working-tank are divided by a partition, R, extending crosswise of the furnace, and the partition is provided with an opening, *a*, at its lower edge to let the glass pass through from the clearing-tank into the working-tank. This partition, which is preferably constructed of stone, is dovetailed in the furnace-bottom to keep the partition from rising up when glass is melted.

The melting-tank and the clearing-tank are divided by a partition extending crosswise of the furnace and from the bottom of the furnace to the arch which covers the top of the tanks. This partition is to extend crosswise through the gas and air regenerators on both sides or on both ends, and has openings *b* on bottom edge, where it rests on tank-bottom, so that the melted glass can run through from the melting-tank A into the clearing-tank A', and thence through the opening in the partition R into the working-tank A''.

By melting glass in a furnace constructed in accordance with our invention the glass can be heated to a higher grade of heat in the melting-tank while in operation, while at the same time the heat can be regulated in the clearing and the working tanks to suit the glass for the best working capacity, while the glass can be worked and gathered without its getting cold from the cold air blowing in from the gathering-ring holes c at the end of the furnace. The holes d at the opposite end of the furnace are for the purpose of putting in the unmelted batch.

The partition S, hereinbefore referred to, will prevent the cold air from passing through the furnace, either from one end or the other, or from either side, when the holes or openings are exposed to gather the glass or to put in the batch, and will also separate the burning gas and air from the working part and the melting part.

The two cold-air flues which divide the sides of the tank and the generators have a suitable number of chimneys, T, through them, which pass up through the top of the furnace and will draw through the heated air which accumulates while the furnace is in operation; otherwise this air would come out either one end or the other and make it disagreeable to the men at the furnace.

The sides of the furnace may be provided with holes and arches for the purpose of taking out the brick-work and examining the generators while the furnace is in operation.

The interior construction of the chambers B C is substantially the same as those shown and described in the patent upon which the present invention is designed as an improvement.

The checker-brick U and the deflecting-brick V are substantially the same as those employed in the patent herein referred to, and are separated by a suitable partition, e.

The pipes or flues L M and N O, which connect with the gas producers or generators K also connect with the regenerator-chambers H, thereby forming a communication between the chambers and generators. These flues connect with the main flues W, which lead from the gas-producers, and the two-way valves P, which may be of any well-known construction, direct the flow of gas either in one or the other of the flues, as occasion may deem necessary.

Leading from the exit-ports of the regenerator-chambers H are flues B' C' at each end of the furnace, said flues communicating with valve-boxes D', which are provided with suitable valves, as shown in dotted lines, for reversing the direction of the products of combustion and permitting them to escape to the flues E', and thence therefrom to the stack F'.

The deflectors V are located below, and are separated from the regenerator-brick, as hereinbefore described, and check the volume of gas and direct it into the flues E'. The flues G', which also communicate with the stack F', project from the valves P, and are for the purpose of conducting off the waste or escaping gas.

Having now fully described our invention, what we claim as new, and desire to secure by Letters Patent, is—

1. The combination, in a glass-melting furnace provided with regenerators on each side, of two separate tanks, one of said tanks being provided with a partition, a partition-wall extending through said furnace entirely separating said tanks except by an opening or openings at its bottom, said partition also dividing the regenerators into two distinct portions, and separate gas-producers connected by flues and suitable valves to each of said portions, substantially as described.

2. The combination, in a glass-melting furnace provided with regenerators on each side, of two separate tanks, a partition-wall extending through said furnace entirely separating said tanks except by an opening or openings at its bottom, said partition also dividing the regenerators into two distinct portions, and separate gas-producers connected by flues and suitable valves to each of said portions, substantially as described.

In testimony that we claim the above we have hereunto subscribed our names in the presence of two witnesses.

PHILIPP SCHLACHTER.
FRITIOF HEINTZ.

Witnesses:
A. J. COLWELL,
J. C. PRIKEY.